US 8,621,419 B2

(12) United States Patent
Woodgeard (10) Patent No.: US 8,621,419 B2
(45) Date of Patent: *Dec. 31, 2013

(54) AUTOMATING THE LIFE CYCLE OF A DISTRIBUTED COMPUTING APPLICATION

(75) Inventor: Larry A. Woodgeard, Lawrenceville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1054 days.

This patent is subject to a terminal disclaimer.

(21) Appl. No.: 12/207,748

(22) Filed: Sep. 10, 2008

(65) Prior Publication Data

US 2009/0007131 A1 Jan. 1, 2009

Related U.S. Application Data

(63) Continuation of application No. 10/608,942, filed on Jun. 27, 2003, now Pat. No. 7,437,706.

(51) Int. Cl.
*G06F 9/44* (2006.01)

(52) U.S. Cl.
USPC ............ 717/103; 717/102; 717/115; 717/121

(58) Field of Classification Search
None
See application file for complete search history.

(56) References Cited

U.S. PATENT DOCUMENTS

| | | | |
|---|---|---|---|
| 6,009,455 A | 12/1999 | Doyle | |
| 6,665,860 B1 * | 12/2003 | DeSantis et al. | 717/115 |
| 6,687,735 B1 | 2/2004 | Logston et al. | |
| 6,848,101 B2 | 1/2005 | Mackawa et al. | |
| 6,983,400 B2 | 1/2006 | Volkov | |
| 7,085,853 B2 | 8/2006 | Volkov et al. | |
| 7,110,936 B2 | 9/2006 | Hiew et al. | |
| 7,210,119 B2 * | 4/2007 | Pothos et al. | 717/102 |
| 7,739,660 B2 * | 6/2010 | Sun | 717/121 |
| 7,765,521 B2 * | 7/2010 | Bryant | 717/103 |
| 2002/0199170 A1 * | 12/2002 | Jameson | 717/120 |
| 2003/0200527 A1 * | 10/2003 | Lynn et al. | 717/102 |
| 2003/0200536 A1 | 10/2003 | Stuefe | |
| 2003/0236577 A1 | 12/2003 | Clinton | |
| 2007/0022404 A1 * | 1/2007 | Zhang et al. | 717/103 |

OTHER PUBLICATIONS

Laszewski et al; The Java CoG Kit User Manual, Draft Version 1.1a; Mar. 14, 2003; pp. cover, 81-85.
Woodgeard; U.S. Appl. No. 10/608,942, filed Jun. 27, 2003.
Woodgeard; Non-Final Rejection mailed Jan. 25, 2007 for U.S. Appl. No. 10/608,942, filed Jun. 27, 2003.
Woodgeard; Final Rejection mailed Jul. 11, 2007 for U.S. Appl No. 10/608,942, filed Jun. 27, 2003.
Woodgeard; Examiner Interview Summary mailed Sep. 4, 2007 for U.S. Appl. No. 10/608,942, filed Jun. 27, 2003.
Woodgeard; Non-Final Rejection mailed Dec. 5, 2007 for U.S. Appl. No. 10/608,942, filed Jun. 27, 2003.
Woodgeard; Examiner Interview Summary mailed Feb. 5, 2008 for U.S. Appl. No. 10/608,942, filed Jun. 27, 2003.
Woodgeard; Notice of allowance and Fees Due mailed Jun. 6, 2008 for U.S. Appl. No. 10/608,942, filed Jun. 27, 2003.

* cited by examiner

*Primary Examiner* — Thuy Dao
(74) *Attorney, Agent, or Firm* — Hartman & Citrin LLC (57) ABSTRACT

A system for automating the life cycle of a software application is provided. The software application utilizes computing resources distributed over a network. A representative system includes creating logic operable to create a task list which describes how at least one stage in the application life cycle is to be performed, and processing logic responsive to the creating logic, operable to process the task list to perform at least one stage in the application life cycle. The processing logic is integrated with a development environment, and the development environment is used to develop the software application.

11 Claims, 8 Drawing Sheets

AUTOMATING THE LIFE CYCLE OF A DISTRIBUTED COMPUTING APPLICATION

CROSS-REFERENCE TO RELATED APPLICATIONS

This application is a continuation of U.S. Ser. No. 10/608,942, now U.S. Pat. No. 7,437,706, which was filed on Jun. 27, 2003, and published as U.S. Patent Publication No. 2004/0268293, which is incorporated herein by reference in its entirety.

FIELD OF THE INVENTION

The present invention relates generally to distributed computing software, and more particularly to tools used to develop and build distributed computing software.

DESCRIPTION OF THE RELATED ART

For many years, scientists, academics and engineers have used computers to solve complex problems. Computers are used, in many different disciplines, for tasks such as modeling, simulation and forecasting. For example, the scientific community has used such networks to sequence genes, analyze astronomic data and analyze weather forecast data. Because these tasks are computationally complex and/or involve huge amounts of data, high-performance computers are generally used, and many interesting problems are not investigated because access to such high-performance computers is very limited.

A relatively new approach to, complex computing relies on the aggregate computing power of networks of computers instead of individual high-performance computers. These networks are known as "computational grids", or simply "grids," while the computers on the grid are called "grid nodes." The infrastructure of these computational grids is designed to provide consistent, dependable, pervasive and inexpensive access to computing resources, which in the aggregate provide high performance computing capabilities.

To take advantage of computational grids, a computing task is decomposed so that it runs in parallel on multiple grid nodes. Some computing tasks are suited for data decomposition, where the same application executes on many grid nodes in parallel using different data. Others are suited for task decomposition, where different applications execute on many grid nodes in parallel using the same data. Other forms of decomposition are also possible, as well as a combination of multiple forms of decomposition.

Grid computing began in the academic and scientific community. The tools first used to develop applications for the grid were therefore those familiar to academics and scientists, and were typically based on the Unix operating system and the C programming language. These software developers are comfortable with the "bare bones" development environment provided by Unix, with features such as command line interpreters, shell scripts, etc.

Grid computing is now beginning to spread to the business community. Software developers in the business community typically use a different set of tools and a different development environment. In order to make grid computing more accessible to the wider business community, there is a need for systems and methods that address these and/or other perceived shortcomings of the prior art.

SUMMARY OF THE INVENTION

One embodiment, among others, of the present invention provides systems and methods for automating the life cycle of a software application. The software application utilizes computing resources distributed over a network. A representative system includes creating logic operable to create a task list which describes how at least one stage in the application life cycle is to be performed, and processing logic responsive to the creating logic, operable to process the task list to perform at least one stage in the application life cycle. The processing logic is integrated with a development environment, and the development environment is used to develop the software application.

One method, among others, includes: creating a task list which describes how at least one stage in the life cycle is to be performed; and processing the task list by a process engine to perform at least one stage in the life cycle. The process engine is integrated with a development environment, and the development environment is used to develop the software application.

DETAILED DESCRIPTION

Figure 1:
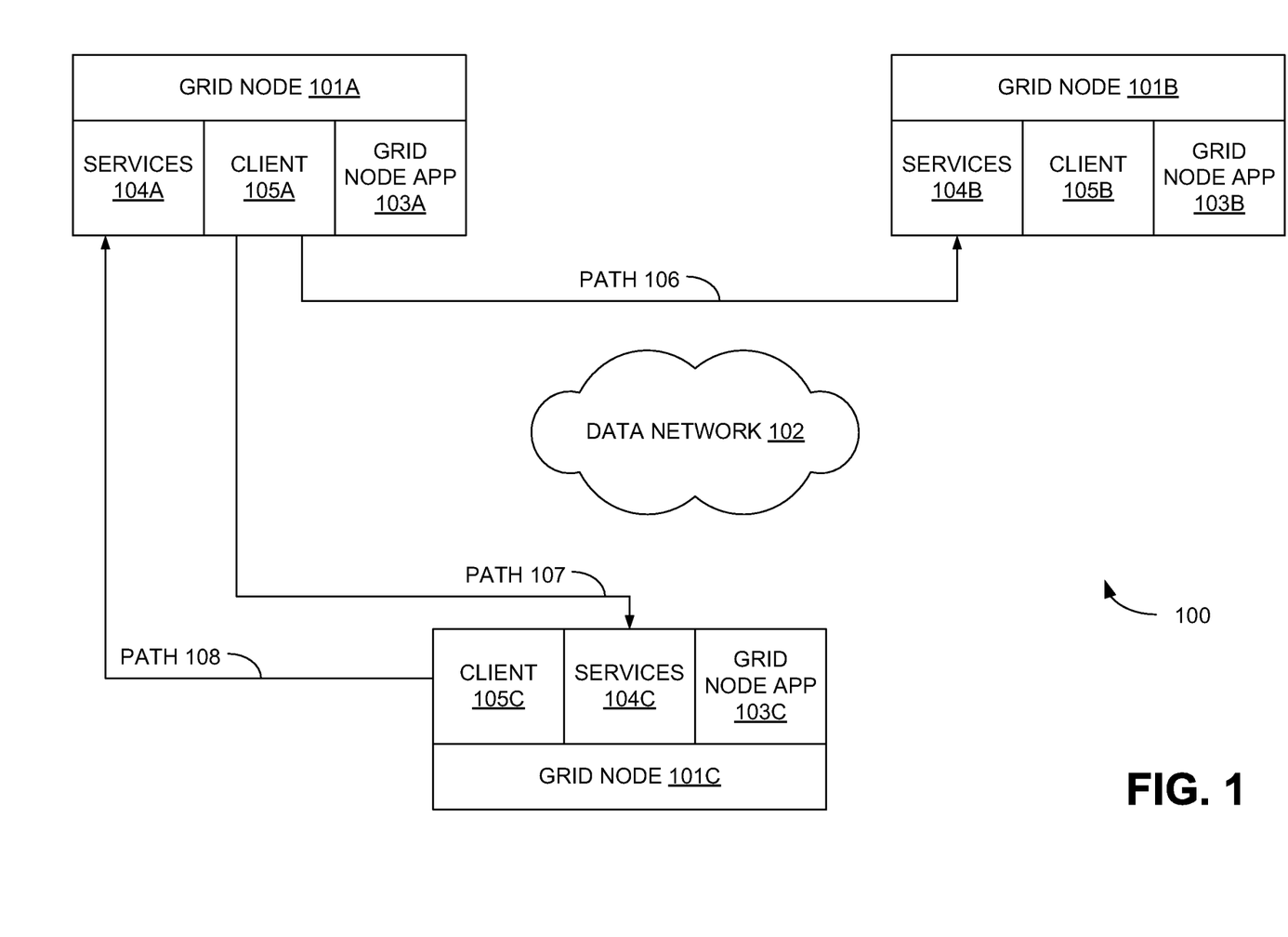
FIG. 1 is a block diagram of a network of distributed computing resources.

FIG. 1 is a block diagram of a network of distributed computing resources 100. The network 100 consists of one or more computing resources 101a-c in communication with each other through data network 102 (connections to network not shown). As described above, this grid 100 can be used to perform computing tasks which are typically very complex and/or involve a very large amount of data. The term "computing resources" includes many different types of resources, not just computers. Other examples include storage resources, file systems, and databases. In order to simplify the explanation of the invention, the computing resources described herein will be computers, but the principles of this invention apply to all types of computing resources. The network will be referred to hereinafter as the grid 100, computing resources will be referred to as grid nodes 101a-d, and an application that runs on a grid node to perform a computing task (or subtask, if the computing task has been decomposed) will be called a grid node application 103.

To execute a grid node application 103 on a grid node 101, nodes which can provide appropriate computing resources must first be identified, and the grid node application 103 must be submitted to the identified node(s) as a job for execution. Rather than using a centralized resource manager and/or job submission manager, the grid 100 as it exists today uses a decentralized approach, where each grid node 101 provides: grid services 104 which support resource discovery, job submission, and other functionality; and a grid client 105 which uses the grid services 104 provided by other grid nodes 101. This can best be illustrated by an example.

In FIG. 1, grid node 101a submits a grid node application 103 for execution on grid node 101b and grid node 101c. This is accomplished by grid client 105a using the grid services 104b provided by grid node 101b (shown by path 106) and using the grid services 104c provided by grid node 101c (shown by path 107). Grid node 101a also executes another grid node application 103, using its own computing resources, on behalf of grid node 101c. This is accomplished by grid client 105c using the grid services 104a provided by grid node 101a (shown by path 108).

In FIG. 1, grid client 105 is shown as a single entity which communicates with the single entity grid services 104. Since grid services 104 provides different types of services, in some embodiments grid services 104 may be implemented by multiple entities within grid node 101. For example, the resource discovery functions could be implemented by a grid resource service and the job submission functions could be implemented by a job submission service. Similarly, in some embodiments, the grid client 105 may be implemented by separate grid client utility programs executing on grid node 101. For example, a Grid-Info-Search client program could communicate with grid services 104 to access resource discovery services and a Grid-Run client program could communicate with grid services 104 to access job submission services.

Figure 2:
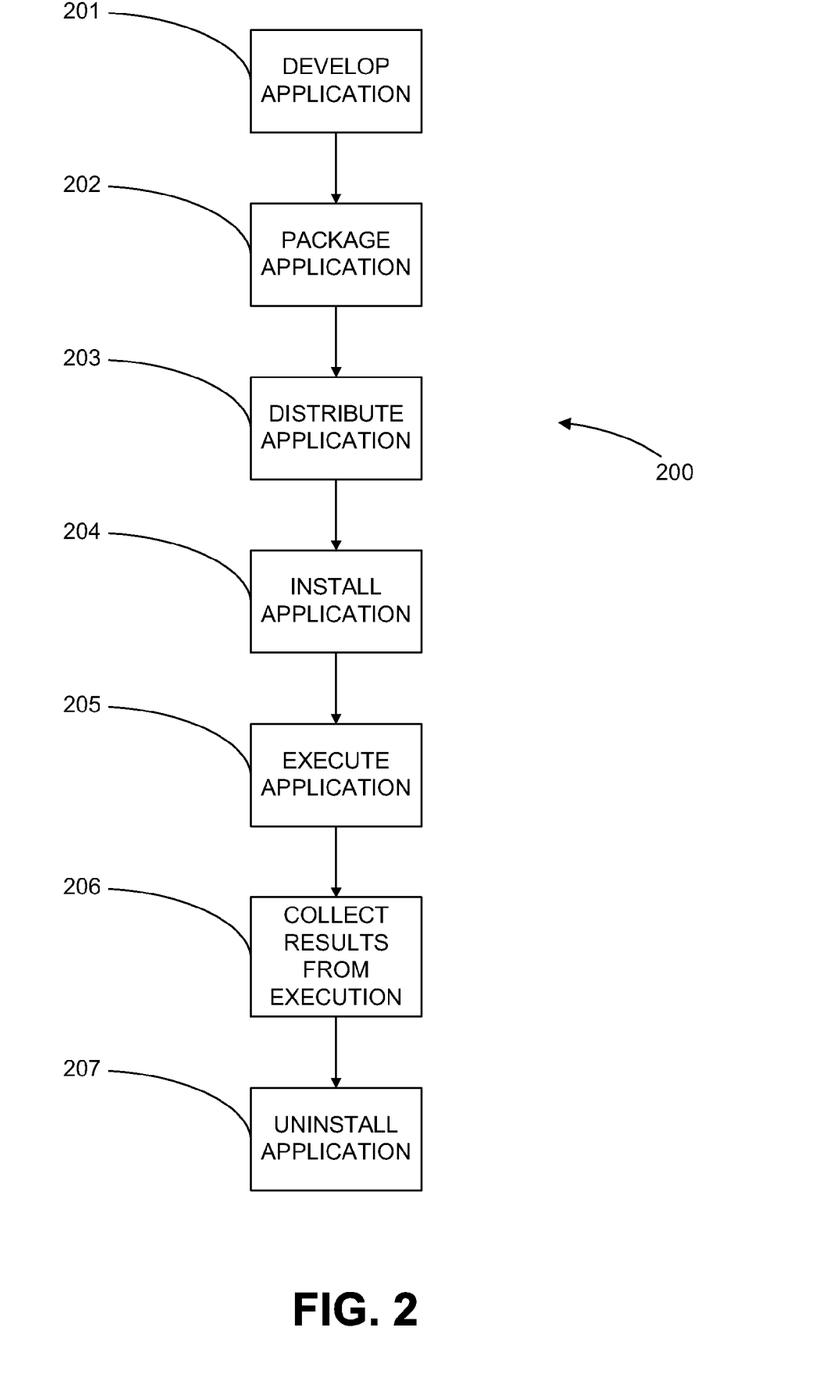
FIG. 2 is a block diagram of the software life cycle of a grid node application from FIG. 1.
Figure 6:
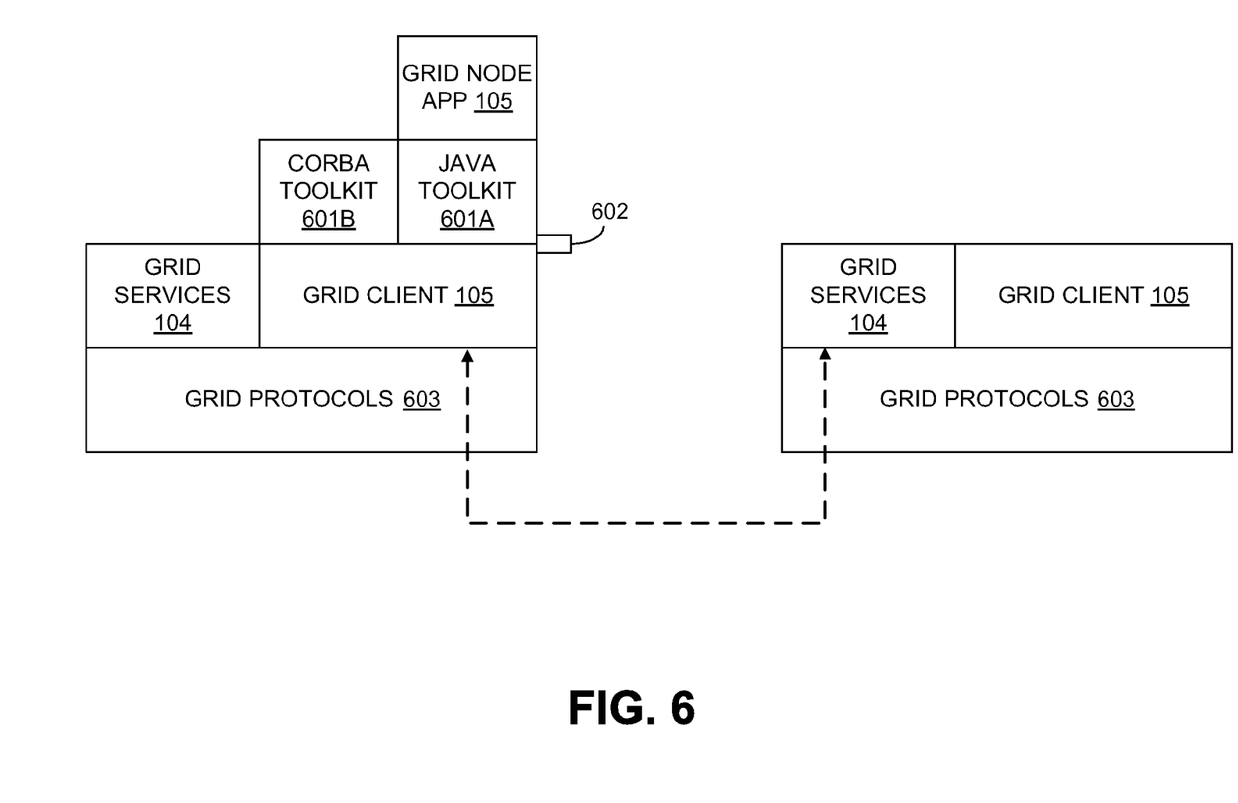
FIG. 6 is a block diagram of the software components that one embodiment of the process engine of FIG. 4 uses to invoke grid services of FIG. 1.

FIG. 2 is a block diagram of the software life cycle 200 of a grid node application 103. The life cycle 200 consists of multiple stages: development 201; packaging 202; distribution 203; installation 204; execution 205; collection 206; and cleanup 207. In the development stage 201, the grid node application 103 is developed using application development tools, for example, an editor, a compiler and a Grid toolkit 601 (FIG. 6).

In the packaging stage 202, the grid node application 103 is packaged, so that all files required to run the application are packaged together. For example, an application written in Java may require several different applets and classes in order to run, and these components can be aggregated into a single archive file. Packaging is often used because it simplifies transfer of the application to another system, but packaging stage 202 is not necessary.

In the distribution stage 203, grid node application 103 is distributed to the target nodes where it will run. Distribution stage 203 may involve the transfer of a single file (particularly if packaging is used) or it may involve transferring each required file individually. If a node requires additional installation after files are distributed, for example, setting up the run-time environment on the target nodes, then the installation stage 204 performs installation.

At the execution stage 205, grid node application 103 executes on the target nodes. At the collection stage 206, the results from the execution of the grid node application 103 on one or more target nodes are collected. At the uninstall stage 207, the grid node application 103 is uninstalled, removing it from the target nodes.

FIG. 2 is intended as an illustration of a typical life cycle 200. However, some stages are optional, so that the life cycle 200 of a particular grid node application 103 may not have all stages shown in FIG. 2. For example, the packaging stage 202 and the installation stage 204 are often unnecessary for a particular grid node application 103. It is also possible for the life cycle 200 of a particular grid node application 103 to contain additional stages not shown in FIG. 2.

Life cycle 200 does not always progress from one stage to another in a strict sequence. Instead, it is common for a subset of stages in the life cycle 200 to be repeated. For example, while the grid node application 103 is still under development, the development stage 201 and packaging stage 202 may be repeated many times while the developer debugs the grid node application 103, while the remaining stages are not required because the developer executes the grid node application 103 locally rather than using the grid 100. As another example, when development is complete, the stages of distribution, execution and collection may be repeated may times as the user runs the grid node application 103 on several different sets of target nodes.

Figure 3:
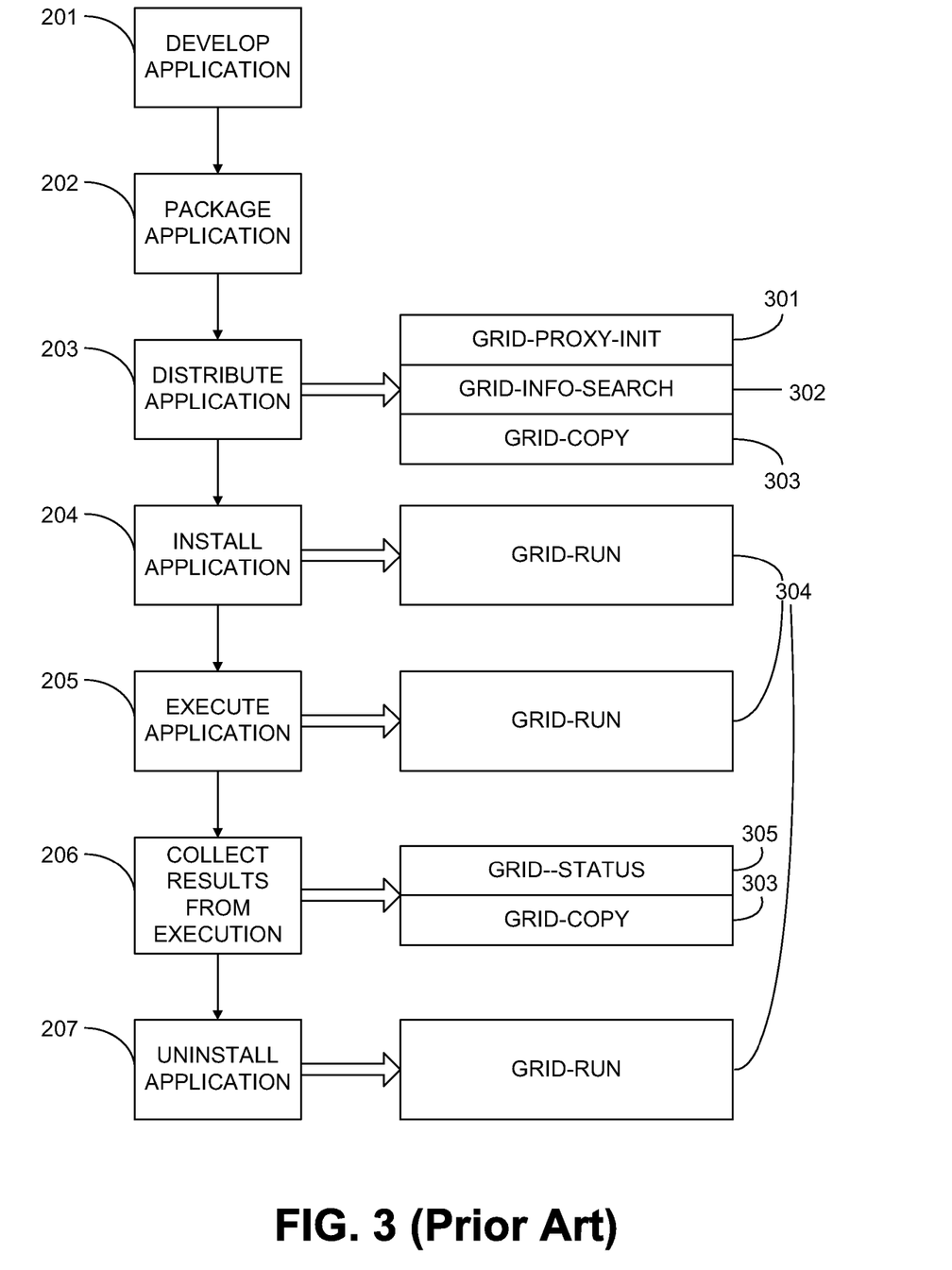
FIG. 3 is a diagram showing how some prior art performs stages in the software life cycle of FIG. 2, using one or more grid client programs.

FIG. 3 is a diagram showing how some prior art performs stages in life cycle 200 using one or more grid client programs. Typically, the development stage 201 and the packaging 202 are performed with standard application development tools (e.g. compiler, editor, compression utility, etc.) However, other stages are performed with one or more grid client programs which use various grid services 104. (Alternatively, as explained above, a single grid client 105, with access to all grid services 104, could be used instead).

In the example shown in FIG. 3, stage 203 is the distribution stage. Grid-Proxy-Init 301 is a grid client 105 which obtains authenticated access to the grid 100. Grid-Info-Search 302 is a grid client 105 which invokes a query on the meta-information grid service provided by grid services 104 to identify target nodes. Grid-Copy 303 is a grid client 105 which moves files between grid nodes 101. The files can be data files, executable files, or a package file containing a combination of these.

Install stage 204 and Execute stage 205 both use Grid-Run 304 to execute a specific program on the target nodes. Typically, the install stage 204 will execute shell commands or utility programs in order to create directories, move files, uncompress files, etc. Execute stage 205 executes the grid node application 103.

Collect stage 206 is performed using Grid-Status 305, which is a grid client 105 which checks the status of a grid node application 103 which was executed on a target node. Collect stage 206 also uses Grid-Copy 303 to copy output files produced by the execution of the grid node application 103 on the target nodes. Uninstall stage 207 is performed using Grid-Run 304, typically executing shell commands and utilities to delete files from the target nodes and restore environment variables and paths.

As discussed above, in the prior art approach described by FIG. 3, a developer of a grid node application 103 performs some stages using standard software development tools and other stages using grid client programs 105. The developer may automate the stages to some degree by using one or more shell scripts which invoke grid client programs 105 and pass appropriate parameters to the programs. While this level of automation is preferable to manually invoking grid client programs 105 from the command line, a shell script interpreter is a general purpose tool which has no concept of stages in a life cycle, so that some degree of expertise in scripting is required to achieve the desired result of automating the life cycle of a grid node application 103.

Figure 4:
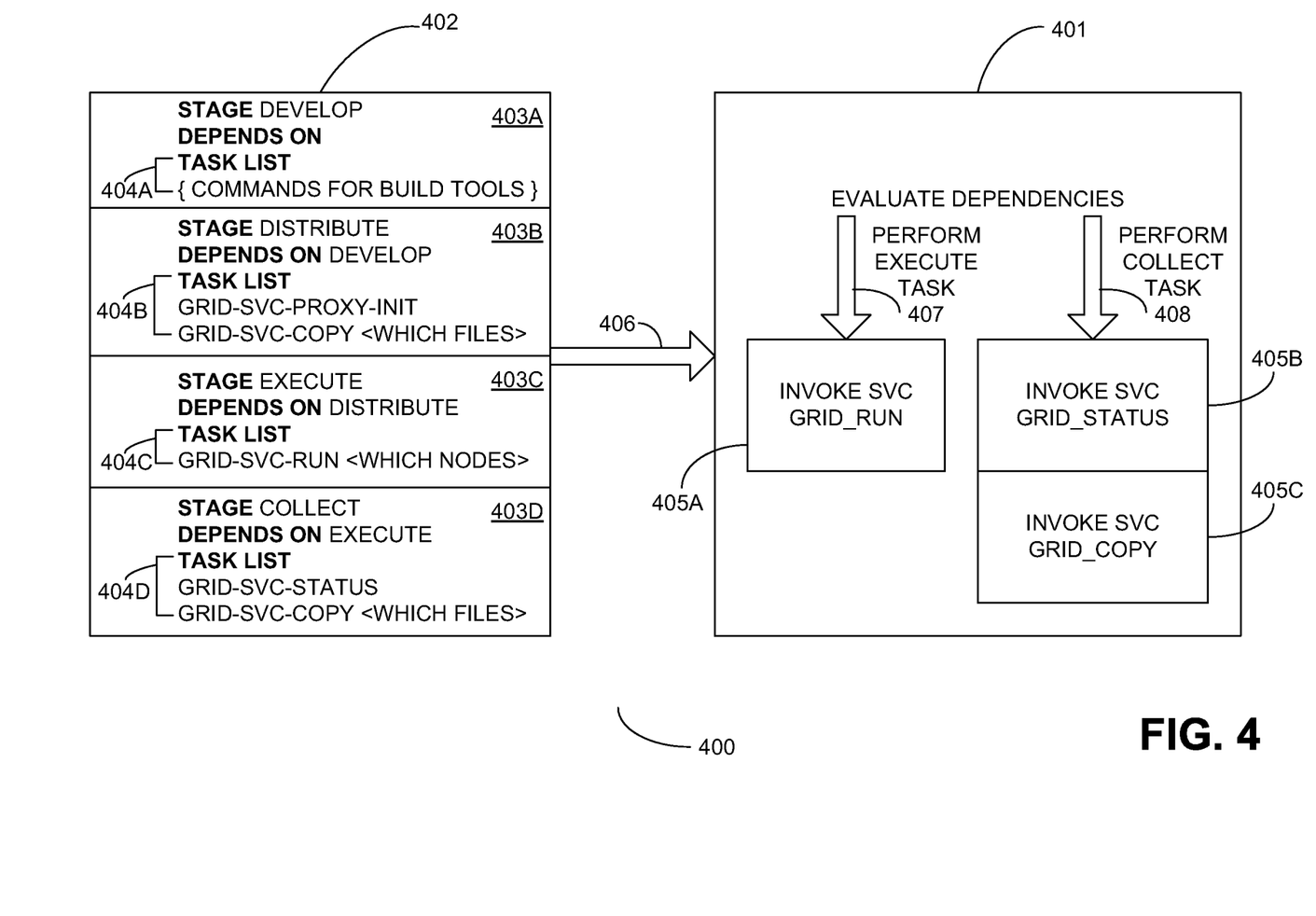
FIG. 4 is a block diagram illustrating one aspect of an embodiment of the system for automating the life cycle of a grid node application.

FIG. 4 is a block diagram illustrating one aspect of an embodiment of the system for automating the life cycle of a grid node application 400. Process engine 401 performs the tasks associated with one or more stages in life cycle 200 of a particular grid node application 103. The life cycle 200 is described in input file 402, which is a text file. Each stage in life cycle 200 corresponds to a section 403a-d in input file 402. Each section 403a-d consists of a task list 404a-d, which is a list of tasks to be performed for that stage. Since input file 402 is a text file, it may be created and edited using any text editor. Alternatively, input file 402 could be created and/or modified by a program.

In one embodiment, process engine 401 does not perform the tasks itself, but relies on individual task subsystems 405 to perform each type of task. In FIG. 4, three types of tasks are performed (Grid-Run, Grid-Status, Grid-Copy) and thus three task subsystems 405a-c are shown. In one embodiment, process engine 401 invokes appropriate grid client utility programs to perform tasks. For example, the Grid-Run task subsystem 405a of process engine 401 invokes the grid client utility program Grid-Run (as discussed with regard to FIG. 3). In another embodiment, process engine 401 uses a toolkit (see FIG. 6) to access grid services 104.

Input file 402 may allow one stage to be specified as dependent on another stage. In FIG. 4, since an application cannot be distributed before it has been developed, section 403b of input file 402 indicates that the distribution stage 203 is dependent on the development stage 201. In one embodiment, a parameter indicates which stage(s) the process engine 401 is to perform, and if dependencies are present, then process engine 401 determines which, if any, other stages must be performed first.

In FIG. 4, the process engine 401 is directed (at 406) to perform the collect task 206. Section 403d of input file 402 represents the collection stage 206, and contains a task list 404d with two tasks: one to check the status of the submitted job; and another to transfer a file containing the results. Process engine 401 determines if grid node application 103 should be executed before results are collected. This determination could be made, for example, by checking for the presence of the output files generated on a target node when grid node application 103 executes. If the output files are not present, then the execution stage 205 should be performed before the collect stage 206. One skilled in the art will understand that process engine 401 could employ a variety of methods to determine dependencies.

Process engine 401 decides to perform (at 407) the task list associated with execution stage 205. The Grid-Run task subsystem 405a executes a grid node application 103 on one or more target nodes. The particular grid node application 103 and target nodes which are passed as parameters to grid services 104 could be specified directly in input file 402, or in another file referenced by input file 402.

At 408, process engine 401 decides to perform the task list associated with collect stage 206. The Grid-Check-Status task subsystem 405b checks the status of a grid node application 103 on one or more target nodes. The Grid-Copy task subsystem 405c copies files from one or more target nodes to the node which submitted the grid node application 103 for execution. Processing by process engine 401 is then complete, as the last task in the collect stage 206 has been performed.

In one embodiment, the process engine 401 verifies that pre-conditions are satisfied before performing a specific task in task list 404. Pre-conditions are specified at the task level, as parameters in input file 402. For example, if the distribution stage 203 includes a task which copies a file to a target grid node 101, preconditions for that task may include: the source file exists; the target grid node 101 exists; there is enough disk space on the target grid node 101, the user has permissions to copy the file and to create and write the file to the target, etc.

Pre-conditions also allow process engine 401 to take into account the specific requirements of a particular grid node application 103 when performing a task. For example, a grid node application 103 may run only on an Intel® platform with a Linux® operating system, so a precondition for the Grid-Run task in this case is that the target grid node 101 meets the specific requirements of the grid node application 103. In one embodiment, the process engine 401 tests preconditions iteratively on all available grid nodes 101 within an organization. To determine whether or not pre-conditions are satisfied for a particular grid node 101, process engine 401 uses grid services 104 to obtain meta-information about the resources available on grid node 101, and compares this with the requirements of the grid node application 103.

While pre-conditions are defined at the task level, the resolution of pre-conditions is handled at the stage level and job level. That is, the section 403 of input file 402 which defines a stage also specifies how failure of a pre-condition is handled. For example, a pre-condition for the collection stage 206 (which collects the results produced by an executed job) would be that the submitted job has successfully completed execution. If this pre-condition is not met, then the submitted job is aborted and/or resubmitted.

Figure 5A:
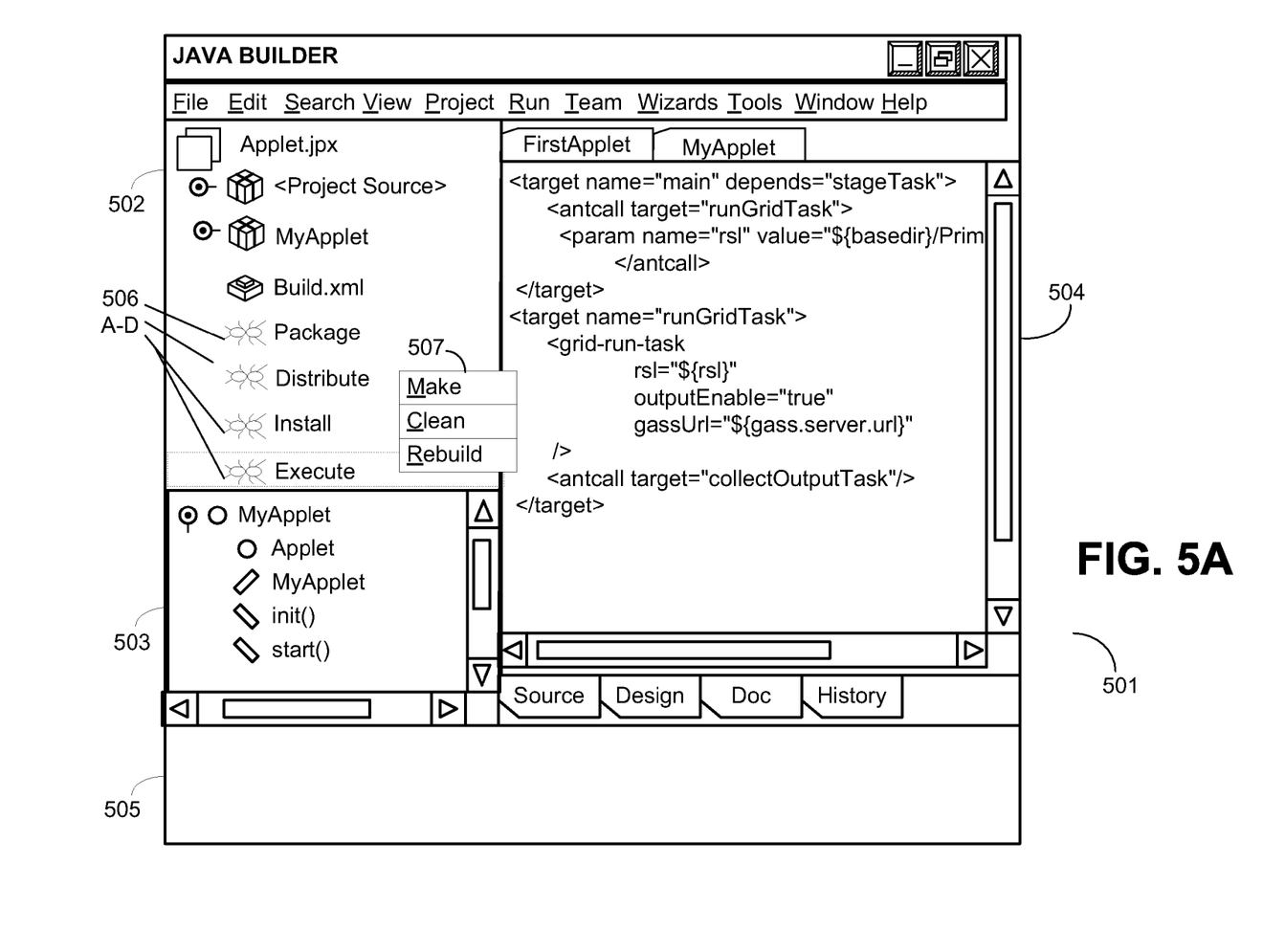
FIG. 5A is a diagram of one embodiment of a user interface for the system for automating the life cycle of a grid node application.

FIG. 5A is a diagram of one embodiment of a user interface for the system for automating the life cycle of a grid node application 400. In this embodiment, grid node application 103 is developed using an integrated development environment 501. Integrated development environment 501 typically includes: a compiler for translating individual source files into object code or into interpreted byte code; a linker for combining multiple object code modules into an executable program; and an editor for creating and modifying source files. Integrated development environment 501 may include other tools. The editor in the integrated development environment 501 may be used to edit task lists 404 contained in input file 402. Process engine 401 is integrated into integrated development environment 501, so that all stages in the life cycle 200 can be performed from within integrated development environment 501.

In this embodiment, the user interface for integrated development environment 501 consists of one window which is split into several panes: the project pane 502; the structure pane 503; the content pane 504; and the message pane 505. The content pane 504 allows editing of source files. The structure pane 503 shows in a hierarchical form the structure of the file that is currently displayed in content pane 504. The message pane 505 displays messages which result from various operations such as building, compiling, debugging and testing.

The life cycle stages described by input file 402 are displayed in project pane 502 as nodes 506a-d. In FIG. 5, node 506d (corresponding to execution stage 205) is selected, a menu 507 of possible actions for that node is displayed, and the menu item Make is chosen. This action invokes process engine 401 and directs process engine 401 to perform the execution stage 205 as described by input file 402.

Figure 5B:
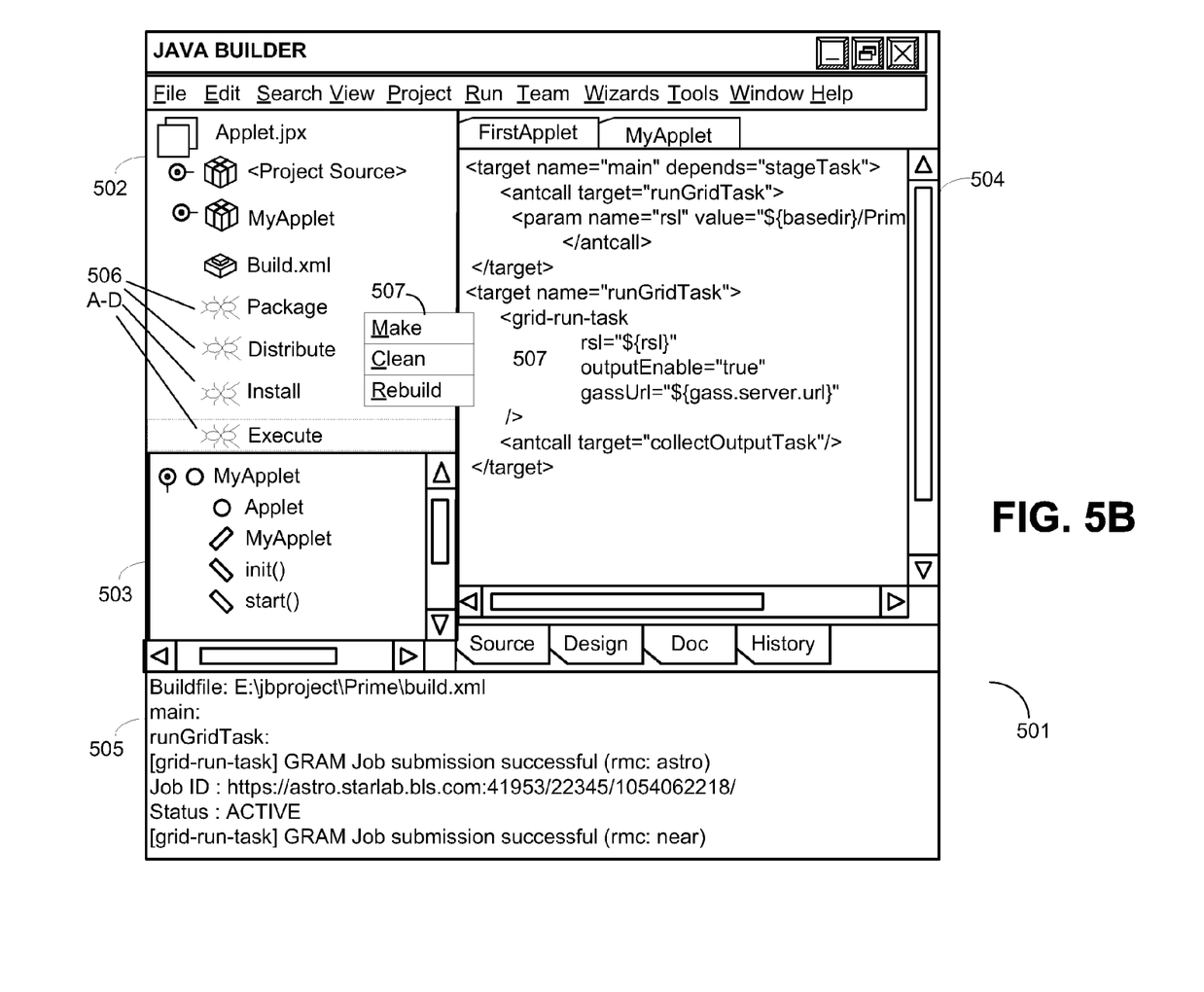
FIG. 5B is a diagram of the user interface after the process engine of FIG. 4 has performed an execution stage.

FIG. 5B is a diagram of the user interface after process engine 401 has performed execution stage 205. The message pane 505 displays any status messages generated by the process engine 401.

In one embodiment, the integrated development environment 501 is Borland JBuilder®, the process engine 401 is Apache Ant™, and the input file 402 is an XML build file. In this embodiment, stages correspond to Ant™ targets, and the tasks are implemented as Java classes which extend the base classes in Ant™.

FIG. 6 is a block diagram of the software components that one embodiment of process engine 401 uses to invoke grid services 104. The software can be viewed as layered. Process engine 401 is developed using an appropriate toolkit 601*a*, *b*. Toolkits 601*a*, *b* are language and framework-specific, for example, toolkit 601*a* is used to develop grid-aware applications in Java while toolkit 601*b* is used to develop grid-aware applications with Common Object Request Broker Architecture (CORBA). In one embodiment, the toolkit is provided by the Globus Java Commodity Grid Kit (Java CoG).

The Process engine 401 invokes grid services 104 through whatever application programming interface (API) is provided by the toolkit. Grid client 105 presents an interface, API 602. Each toolkit 601 uses the GRID client API 602 to programmatically call grid client 105. Grid client 105 uses GRID protocols 603 to communicate (over data network 102) with the grid services 104 residing on another grid node 101.

Figure 7:
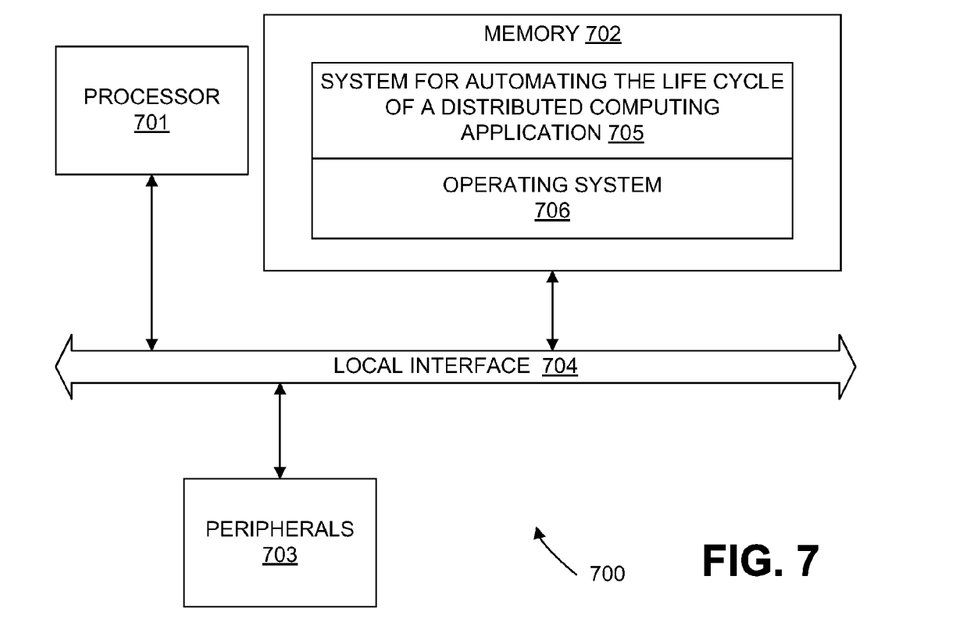
FIG. 7 illustrates an example of an embodiment of a grid node of FIG. 1.

FIG. 7 illustrates an example of an embodiment of a grid node 101 of FIG. 1. Generally, in terms of hardware architecture, the grid node 101 is a general purpose computer including a processor 701, memory 702, and one or more input and/or output (I/O) devices or peripherals 703 that are communicatively coupled via a local interface 704. The local interface 704 can be, for example but not limited to, one or more buses or other wired or wireless connections, as is known in the art. The local interface 704 may have additional elements (omitted for simplicity), such as controllers, buffers, drivers, repeaters, and receivers, to enable communications. Further, the local interface 704 may include address, control, and/or data connections to enable appropriate communications among the aforementioned components.

The peripherals 703 may include input devices, for example but not limited to, a keyboard, mouse, scanner, microphone, etc. Furthermore, the peripherals 703 may also include output devices, for example but not limited to, a printer, display, etc. Finally, the peripherals 703 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

The processor 701 is a hardware device for executing software, particularly that stored in memory 702. The processor 701 can be any custom made or commercially available processor, a central processing unit (CPU), an auxiliary processor among several processors associated with the grid node 101, a semiconductor based microprocessor (in the form of a microchip or chip set), a microprocessor, or generally any device for executing software instructions.

The memory 702 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 702 may incorporate electronic, magnetic, optical, and/or other types of storage media. Note that the memory 702 can have a distributed architecture, where various components are situated remote from one another, but can be accessed by the processor 701.

The software in memory 702 may include one or more separate programs, each of which comprises an ordered listing of executable instructions for implementing logical functions. In the example of FIG. 7, the software in the memory 702 includes the system for automating the life cycle of a distributed computing application 705, and a suitable operating system 706. The operating system 706 essentially controls the execution of other computer programs, such as the system for automating the life cycle of a grid node application 400, and provides scheduling, input-output control, file and data management, memory management, and communication control and related services.

The system for automating the life cycle of a grid node application 400 is a source program, executable program (object code), script, or any other entity comprising a set of instructions to be performed. When a source program, then the program needs to be translated via a compiler, assembler, interpreter, or the like, which may or may not be included within memory 702, so as to operate properly in connection with the operating system 706.

If the grid node 101 is a PC, workstation, or the like, the software in the memory 702 may further include a basic input output system (BIOS) (omitted for simplicity). The BIOS is a set of essential software routines that initialize and test hardware at startup, start the operating system 706, and support the transfer of data among the hardware devices. The BIOS is stored in ROM so that the BIOS can be executed when the grid node 101 is activated.

When the grid node 101 is in operation, the processor 701 is configured to execute software stored within the memory 702, to communicate data to and from the memory 702, and to generally control operations of the grid node 101 pursuant to the software. The system for automating the life cycle of a grid node application 400 and the operating system 706, in whole or in part, but typically the latter, are read by the processor 701, perhaps buffered within the processor 701, and then executed.

When the system for automating the life cycle of a grid node application 400 is implemented in software, it should be noted that the system for automating the life cycle of a grid node application 400 can be stored on any computer readable medium for use by or in connection with any computer related system or computer readable medium. In the context of this document, a "computer-readable medium" can be any means that can store, communicate, propagate, or transport the program for use by or in connection with the instruction execution system, system, or device. The computer-readable medium can be, for example but not limited to, an electronic, magnetic, optical, electromagnetic, infrared, or semiconductor system, system, device, or propagation medium. A non-exhaustive example set of the computer-readable medium would include the following: an electrical connection having one or more wires, a portable computer diskette, a random access memory (RAM), a read-only memory (ROM), an erasable programmable read-only memory (EPROM, EEPROM, or Flash memory), and a portable compact disc read-only memory (CDROM). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system for automating the life cycle of a grid node application 400 is implemented in hardware, the system for automating the life cycle of a grid node application 400 can be implemented with any or a combination of the following technologies, which are each well known in the art: a discrete logic circuit(s) having logic gates for implementing logic functions upon data signals, an application specific integrated circuit(s) (ASIC) having appropriate combinatorial logic gates, a programmable gate array(s) (PGA), a field programmable gate array(s) (FPGA), etc.

Figure 8:
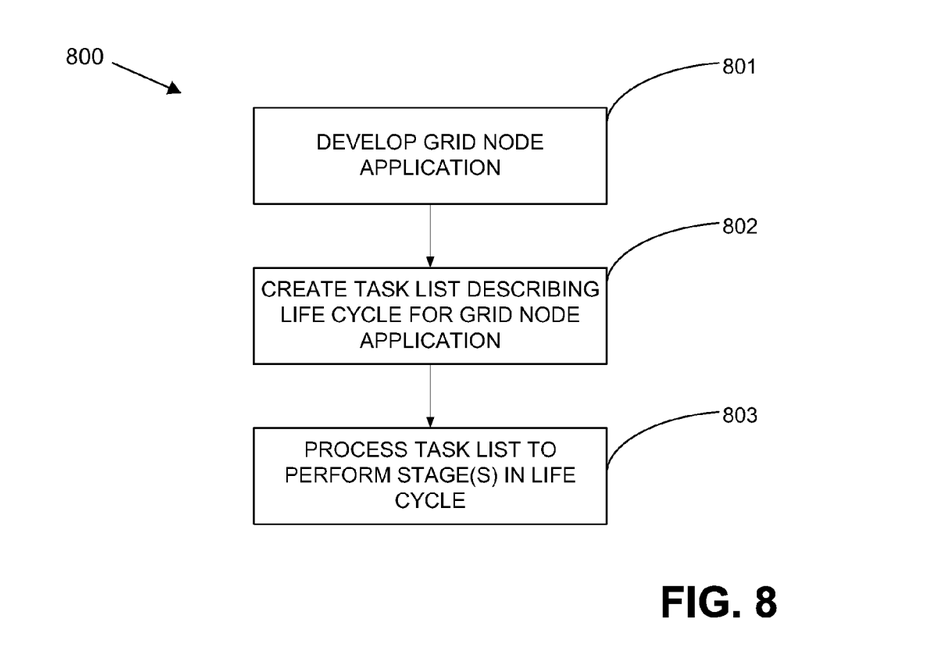
FIG. 8 is a flow chart of a method of automating the life cycle of a distributed computing application.

FIG. 8 is a flow chart of a method of automating the life cycle of a distributed computing application 800. At step 801, a grid node application 103 is developed using integrated development environment 501. At step 802, a task list 404 describing the life cycle 200 of grid node application 103 is created. The task list can be created in a stand-alone editor, or an editor which is integrated into integrated development environment 501, or a program which automatically generates the task list based on user input, or any other suitable mechanism. At step 803, Process engine 401 processes the task list 404 to perform one or more stages in life cycle 200.

The foregoing description has been presented for purposes of illustration and description. It is not intended to be exhaustive or to limit the invention to the precise forms disclosed. Obvious modifications or variations are possible in light of the above teachings. The embodiments discussed, however, were chosen and described to illustrate the principles of the invention and its practical application to thereby enable one of ordinary skill in the art to utilize the invention in various embodiments and with various modifications as are suited to the particular use contemplated. All such modifications and variation are within the scope of the invention as determined by the appended claims when interpreted in accordance with the breadth to which they are fairly and legally entitled.

Therefore, at least the following is claimed:

1. A method for automating a life cycle of a grid node application, where the grid node application utilizes a plurality of computing resources distributed over a network, the method comprising:
   creating, by at least one computer processor, a file describing a plurality of stages of the life cycle, wherein the plurality of stages comprises a development stage, a packaging stage, a distribution stage, an installation stage, an execution stage, a collection stage, and an uninstall stage;
   creating, by the at least one computer processor, a task list in the file which describes how the plurality of stages of the life cycle of the grid node application is to be performed, wherein the plurality of stages is assigned to be distributively performed by a plurality of grid nodes in a computational grid;
   managing, by the at least one computer processor, processing of the task list by a process engine to perform the plurality of stages of the life cycle by the plurality of grid nodes in the computational grid, the process engine being integrated with a development environment, and the development environment being a grid node application development environment;
   as part of the installation stage, installing the grid node application to a target node, wherein the grid node application is executed in accordance with the task list; and
   as part of the uninstall stage, uninstalling the grid node application from the target node, wherein results of execution of the grid node application are transferred from the target node to the at least one computer processor.

2. The method of claim 1, wherein the distribution stage includes at least distributing the grid node application to at least one remote computing resource on the network, the at least one remote computing resource comprising the target node that is one of the plurality of grid nodes in the computational grid.

3. The method of claim 1, wherein the development environment is an integrated development environment.

4. The method of claim 1, wherein the grid node application utilizes the plurality of computing resources through service providers connected to the network.

5. The method of claim 1, wherein the file is a text file.

6. The method of claim 5, wherein the text file is an extensible markup language (XML) file.

7. The method of claim 1, further comprising verifying that a precondition associated with a task in the task list is satisfied before performing the task.

8. The method of claim 1, further comprising:
   verifying that a precondition is satisfied before performing a task of the task list, wherein the precondition is associated with the task in the task list and describes requirements of a system on which the grid node application executes.

9. The method of claim 1, further comprising:
   obtaining a description of available resources for at least a portion of the plurality of computing resources; and
   verifying that a precondition is satisfied before performing a task, wherein the precondition is associated with the task in the task list and describes system requirements of the grid node application.

10. A method for automating a life cycle of a software application, where the software application utilizes a plurality of computing resources distributed over a network, the method comprising:
    creating, by at least one computer processor, a file describing a plurality of stages of the life cycle, wherein the plurality of stages comprises a development stage, a packaging stage, a distribution stage, an installation stage, an execution stage, a collection stage, and an uninstall stage;
    creating, by the at least one computer processor, a task list in the file which describes how the plurality of stages in the life cycle of the software application is to be performed, wherein the plurality of stages is assigned to be distributively performed by a plurality of grid nodes in a computational grid;
    managing, by the at least one computer processor, processing of the task list by a process engine to perform the plurality of stages in the life cycle by the plurality of grid nodes in the computational grid;
    as part of the installation stage, installing the software application to a target node, wherein the software application is executed in accordance with the task list; and
    as part of the uninstall stage, uninstalling the software application from the target node, wherein results of execution of the software application are transferred from the target node to the at least one computer processor.

11. The method of claim 10, wherein the process engine is integrated with a development environment, and the development environment is a software application development environment.

* * * * *